E. GRASS.
PROCESS OF ETCHING.
APPLICATION FILED MAY 24, 1917.
1,313,233.
Patented Aug. 12, 1919.
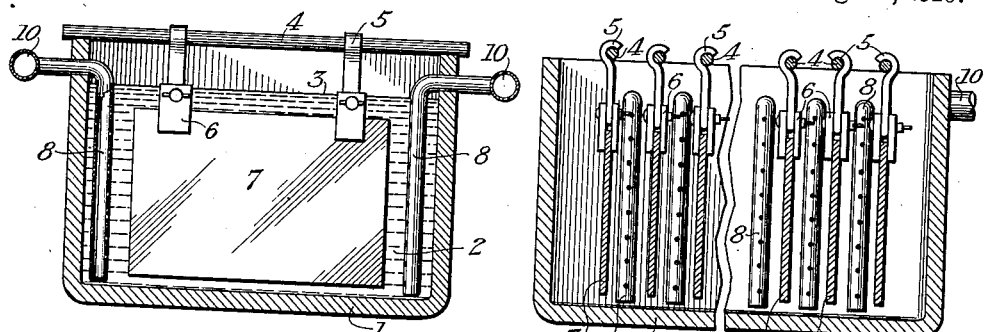
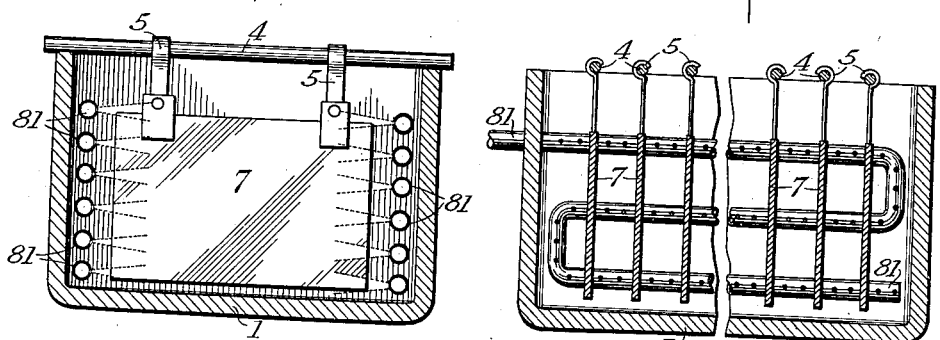
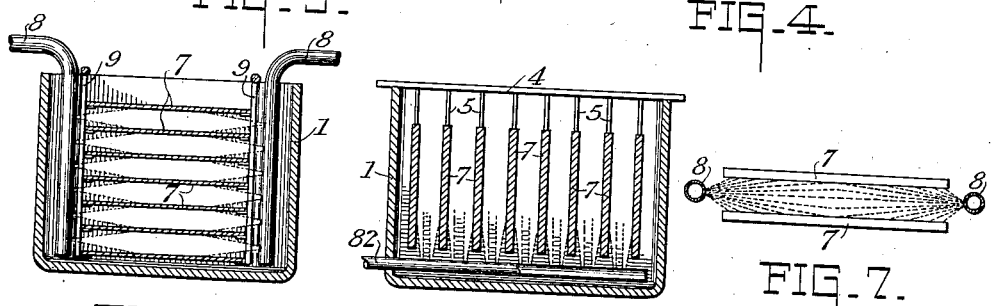
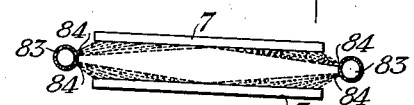
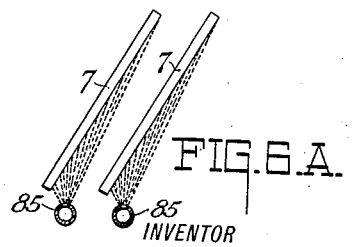
WITNESSES:
INVENTOR
Ernest Grass.
BY Ray L. Stinchfield
ATTORNEY

UNITED STATES PATENT OFFICE.

ERNEST GRASS, OF ROCHESTER, NEW YORK, ASSIGNOR TO EASTMAN KODAK COMPANY, OF ROCHESTER, NEW YORK, A CORPORATION OF NEW YORK.

PROCESS OF ETCHING.

1,313,233.  Specification of Letters Patent.  Patented Aug. 12, 1919.

Application filed May 24, 1917. Serial No. 170,788.

*To all whom it may concern:*

Be it known that I, ERNEST GRASS, a subject of the King of Great Britain, residing in Rochester, in the county of Monroe and State of New York, have invented certain new and useful Improvements in Processes of Etching; and I do hereby declare the following to be a full, clear, and exact description of the same, reference being had to the accompanying drawings, forming a part of this specification, and to the reference-numerals marked thereon.

This invention relates to a process of etching plates such as are used, for example, in photo-engraving or analogous arts, the working surfaces of which are so prepared as to leave exposed to the attacks of the etching liquid those portions which it is desired to etch.

The principal objects of my invention are to provide a process in which a large number of plates can be rapidly and economically etched in a relatively small space without any loss in the good quality of the product; to provide a process in which the etching bath will be agitated in those lines or directions which are most favorable for rapid and high-class work; and to employ a process in which the agitating operation aids in maintaining the proper condition of the bath and also assists in regenerating it when necessary. Other objects will hereinafter appear.

It has been customary in this art to carry out the etching processes on but one or few plates at a time in each piece of etching apparatus, and, as a result, much space has been required by the duplicated apparatus when a plurality of plates were simultaneously treated. This amount of apparatus has been costly, particularly when machines were used, and the occupation of such excessive floor space caused high investment, rent, and other "over-head" charges. In the prior art it was also considered necessary for best results to agitate the etching liquid along lines which were practically perpendicular to the submerged surface that was being etched and to hold the plate with said surface facing downward. I have discovered that the surfaces may be uniformly and rapidly etched regardless of the angle or position in which the plate is located provided the surface of the plate be in contact with the body of etching liquid and the latter be agitated by gas laterally or obliquely with respect to the surface to be etched. This discovery enables me to support a large number of plates in suitably spaced relation and to force agitating gas between them in such a way as to cause lateral or oblique agitation. In this way a large number of plates may be inexpensively etched in a space in which formerly only one plate could be treated at a time. I have also discovered that if the agitating gas contains oxygen and the etching bath be an oxidizing one, the tendency of the gas is to maintain the proper state of oxidation of the bath and to a certain extent regenerate the same, when small amounts of auxiliary chemicals are added.

In the accompanying drawings in which like reference characters represent similar parts throughout the several views, Figure 1 is a transverse section of an apparatus in which my process may be carried out. Fig. 2 is a longitudinal section thereof, parts being broken away. Figs. 3, 4, 5, 6, and 6ᴬ are diagrammatic sectional views of various modifications and Figs. 7 and 8 are diagrams indicating directions along which the lines of agitation may proceed.

In the preferred embodiment of my invention which I have chosen for illustration the plates 7, which may be of any usual metal such as copper or brass bearing suitable resist images, are suspended in an etching liquid or bath 2 contained in a suitable tank 1. The plates are carried by any convenient means such as jaws 6 on hooks 5 which are suspended from cross bars 4. As indicated in Fig. 2, the plates may be located quite near each other and the surfaces to be etched may be arranged either toward each other or facing toward the same end of the tank. It is essential that the surfaces to be etched be either entirely submerged or in full contact with the bath 2, the upper surface of which is indicated at 3, Fig. 1. Along the sides of the tank are manifolds 10 from which a series of pipes 8 lead vertically downward in a position to coöperate with the suspended plates. These pipes 8 are provided with numerous perforations facing inwardly toward the spaces between the plates, so that when gas is forced through the manifolds 10 and pipes 8 into the liquid, it agitates the latter in lines that are lateral or oblique to the surfaces of plates 7 as diagrammatically indicated in Fig. 7. The bubbles of gas which are formed by this operation will tend to move upwardly in the bath, but this upward component will also be substantially lateral or oblique with respect to the surfaces of the plates. The apparatus will, of course, be made of material resistant to the etching bath such as glass, hard rubber, slate, coated wood or metal, etc.

In case the usual ferric chlorid etching bath is used, the agitating gas is preferably one that contains oxygen, such as air. In the etching operation the ferric chlorid is reduced, but the blowing of air through the bath tends to maintain the bath in an oxidizing condition and to regenerate it, if small amounts of hydrochloric acid be added to the bath at intervals. No general rule can be laid down as to the amount of acid to be added or the time for adding it, but in each particular case these factors are easily determined by trial.

Instead of the pipes 8 being arranged vertically along the sides of the tank, pipes may be arranged horizontally thereof, as indicated in Figs. 3 and 4 at 81. While the suspended plates shown in Figs. 1 and 2 are substantially parallel, it is not indispensable that this relation be maintained so long as the agitation is lateral or oblique with respect to the surfaces thereof. Furthermore, it is unnecessary that the plates be always suspended in vertical planes; they may be, for example, supported horizontally in properly spaced relation upon racks 9 as indicated in Fig. 5. Also the pipes which direct the lateral agitating streams of gas may be located in the bottom of the tank as indicated in Fig. 6. Of course, the perforations in the pipes may be arranged in various ways; for example, in Fig. 8 I have shown the pipe 83 provided with two sets of nozzles or openings 84. In Fig. 6ᴬ the plates 7 are inclined with the surface to be etched on the under side and the jets of gas from pipes 85 are directed upwardly and obliquely against said surfaces.

From inspection of Figs. 7 and 8 and from consideration of the fact that the gas emerges from the pipes 8 under pressure, it will be evident that the agitating jets or streams of liquid and gas will be somewhat diverging or expanding so as to strike the surfaces to be etched in a generally lateral or oblique manner. While the pressure of the gas and the quantity thereof will vary according to the requirements of the particular bath and nature of the plates to be etched, the proper conditions can generally be told by visual inspection of the bath which gives an appearance of vigorous agitation or ebullition.

Having thus described my invention, what I claim as new is:

1. The process of etching a plate which comprises, holding a surface of the plate to be etched in contact with a body of etching liquid and agitating said liquid in contact with said surface by passing streams of gas through the liquid laterally of said surface.

2. The process of etching a plate which comprises, holding a surface of the plate to be etched in contact with a body of etching liquid, and passing through the liquid streams of gas obliquely to said surface.

3. The etching process which comprises, holding a plurality of plates with their surfaces to be etched in spaced relation to each other and in contact with a body of etching liquid and forcing streams of gas through the liquid between said surfaces, to agitate said liquid in contact with said surfaces.

4. The etching process which comprises, maintaining a plurality of plates in spaced relation with their surfaces to be etched in contact with a body of etching liquid, and forcing streams of gas through the liquid among said surfaces and laterally with respect thereto.

5. The etching process which comprises, supporting a plurality of plates in spaced relation with their surfaces to be etched in contact with a body of etching liquid, and forcing expanding streams of gas through the liquid to agitate the liquid obliquely with respect to said surfaces.

6. The etching process which comprises, supporting a plurality of plates in substantially parallel spaced relation with their surfaces to be etched immersed in a body of etching liquid and passing streams of gas through the liquid between said surfaces, to agitate the liquid in contact with said surfaces.

7. The etching process which comprises, supporting a plurality of substantially parallel compactly spaced plates to be etched in a body of etching liquid and passing streams of gas through the liquid between the plates, to agitate the liquid in contact with said plates.

8. The etching process which comprises supporting a plurality of plates with their surfaces to be etched in spaced relation to each other in contact with a body of etching fluid in a high state of oxidation and passing agitating streams of oxidizing gas through the liquid.

9. The etching process which comprises, arranging a plurality of plates to be etched, composed of reducing material, in a compact, spaced relation in a bath of etching fluid containing oxidizing materials, agitating said bath by passing therethrough streams of oxygen-containing gas, and adding materials which react with the oxygen and spent materials of the bath to regenerate the latter.

In testimony whereof I have signed this specification in the presence of two witnesses this 16th day of May, 1917.

ERNEST GRASS.

Witnesses:
  MARCUS C. HOPKINS,
  DONALD H. STEWART.